May 12, 1942.  R. J. S. PIGOTT  2,282,676
CHUCK
Filed Oct. 6, 1941
Fig. 1.
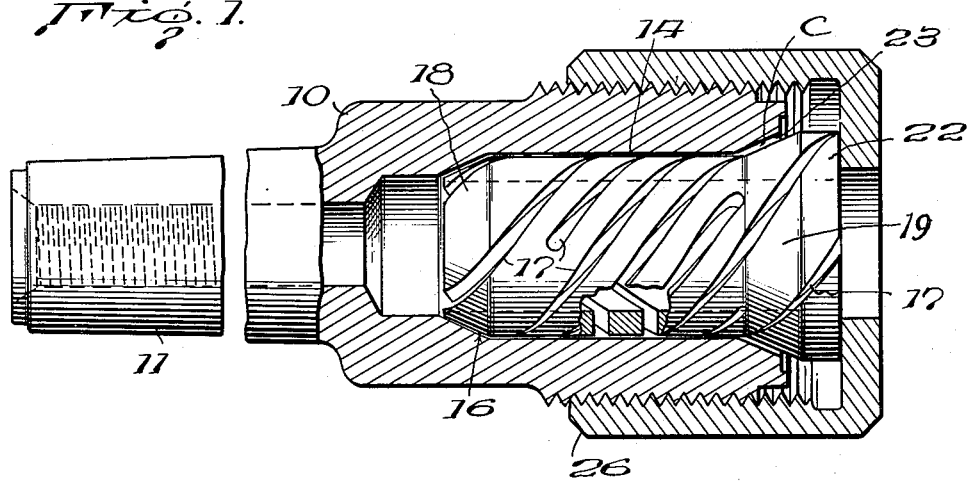
Fig. 2.
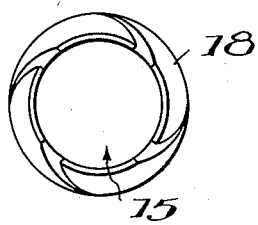
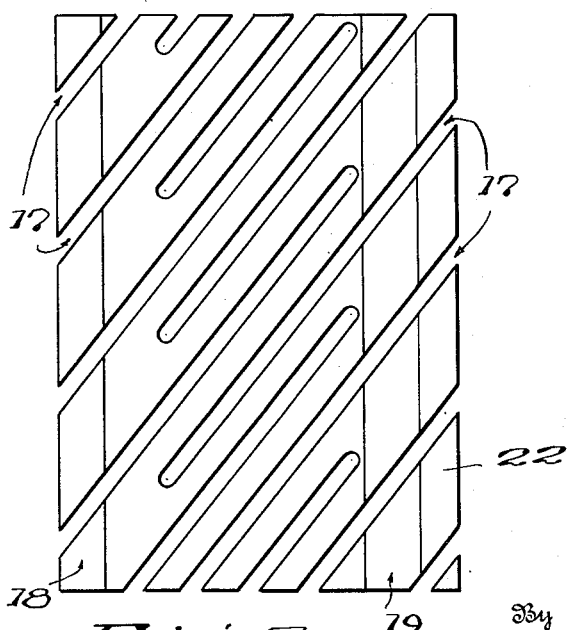
Fig. 4.
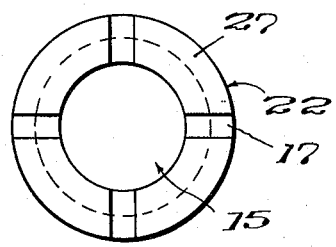
Fig. 3.
Inventor
R. J. S. Pigott,
By A. M. Houghton
His Attorney Patented May 12, 1942

2,282,676

UNITED STATES PATENT OFFICE 2,282,676

CHUCK

Reginald J. S. Pigott, Pittsburgh, Pa., assignor to Gulf Research & Development Company, Pittsburgh, Pa., a corporation of Delaware Application October 6, 1941, Serial No. 413,870

2 Claims. (Cl. 279—51)

This invention relates to chucks; and it comprises, in a collet chuck of the type having an axially bored body member with spaced inner and outer seats and means for compressing a collet against the seats, a collet having seat portions adapted to engage the seats and slotted along helical lines extending from each end of the collet to a point near the other end, whereby radially resilient jaw portions and an axially resilient intermediate portion are provided; all as more fully hereinafter set forth and as claimed.

Collet chucks as used on lathes and other metal-working machinery for holding and centering round work, commonly include a one-piece tubular member split at one or both ends to form unitary jaws, and means for compressing the jaws on the bar, rod, etc., to be machined; that is, the "work." Centering may be accurate and the grip firm, if the work is of the exact dimensions for which the chuck is intended, but with off-size work, or work of non-uniform diameter, centering is apt to be imperfect and wobbling may occur.

Attempts to make chucks more flexible for accommodation of off-size work have in general achieved only a moderate improvement in flexibility, and that at the expense of accurate centering.

In a prior and co-pending application, Serial No. 362,650, filed Oct. 24, 1940, I have disclosed and claimed a chuck making use of a unitary double-end collet with axially slotted jaw portions and an intermediate helical spring portion, so disposed in a body member that on tightening the chuck the rear jaws, urged by resilient pressure, engage the work and then the front jaws engage the work under positive pressure. The chuck affords accurate centering and firm holding of work pieces even when they are so off-size as not to be capable of satisfactory holding in conventional chucks.

The present invention is an improvement on the chuck of my prior application.

Among the objects of the invention are the provisions of a chuck employing a double-end one-piece collet in which a high degree of both axial and radial flexibility is attained while maintaining accurate centering; the provision of a chuck making use of a resilient, double-end collet, which can be made very short and compact but which grips work firmly and accurately at two spaced points along its length; and the provision of a resilient collet chuck member having helical slots extending along its length and opening at the ends thereof, in which both axial and radial flexibility can be determined by controlling the number and length of the helical slots, the spring pitch and the wall thickness thereof.

These and other objects are accomplished by the provision of a chuck including in a body member a double-end collet unitary in structure, having resilient jaw portions defined by helical slots extending from each end to a point past the middle of the collet, the ends being tapered to engage seats in the body member and advantageously so spaced that the inner end engages its seat slightly before the outer end on tightening the chuck. The inner jaws assure centering; the outer jaws are relied on for driving the work while the entire resilient unit is under compression. The chuck, while very compact, is capable of performing the required functions, that is to say, accurate centering in firm wobble-free grip of the work even when the work is so undersized that it would be impossible to use efficiently the devices of the prior art. At the same time it is simple and fool-proof; and it is readily and economically manufactured.

In the accompanying drawing there is shown, more or less diagrammatically, an example of a specific embodiment of apparatus within the purview of the invention. In the drawing, Fig. 1 is a view of the apparatus in central vertical section with some parts in elevation;

Figs. 2 and 3 are views of the collet member in end elevation, and

Fig. 4 is a developed view of the collet member of Fig. 1.

Referring to the drawing, the chuck includes a body member 10 with shank 11 and threaded cap or nut 26, all of which are or can be of conventional construction. The body is bored at 14 and has an inner tapered seat 16 and an outer tapered seat 23, as shown, both facing in the same direction.

Within the bore is a collet member, of unitary tubular construction, axially bored at 15 (Figs. 2 and 3) and having tapered seat portions 18 and 19. The outer (larger) end is advantageously extended cylindrically as at 22, providing a flat working face 21 (Fig. 3) of substantial area adapted to be engaged by nut 26.

In Fig. 2, an end view of the small end of the collet, the large end is omitted from the showing for the sake of clarity.

The collet has a plurality of helical slots 17, shown as eight in number. Four of these open at the outer end of the chuck (Fig. 3) and extend to a zone not far from the inner end; the other four open at the inner end (Fig. 2) and terminate not far from the outer end.

These slots define jaw portions at each end of the collet, as is apparent from the figures. These jaw portions have a very high degree of radial resiliency, but they have no great axial resiliency, because of the wide spacing between slots in their vicinity. The outer jaw portions are additionally stiff axially by reason of the enlarged skirt-like portion 21 (Fig. 1). On the other hand the portion of the collet where the slots inter-leave so to speak is extremely flexible axially, and also radially.

Fig. 4 is a developed view of the collet of Fig. 1; that is, it shows the collet as if slit along an element and laid out flat.

The helical slots may be right or left-hand, but in general if the tightening nut has a right-hand thread it is advantageous to have the slot helices left-hand for the reason that the arrangement tends to wrap the collet on the work while tightening.

The seat spacing of the collet is slightly greater, in its uncompressed state, than the spacing of body seats 16 and 23; a slight clearance being left at C. Thus when the chuck is tightened on a work piece the inner jaw portions are compressed on the work under resilient pressure (of the central part of the collet) while the outer jaw portions are compressed on the work under the solid pressure of the nut. Thus the inner jaws need have little or no work-driving function, their function being to center the work and hold it against radial displacement, while the outer jaws are relied on for both centering and driving the work. They can be made as thick as desired.

The outer diameter of the collet is sufficiently smaller than bore 14, as shown, to permit free expansion of the collet.

The several seats, 16, 18, 19 and 23 are all advantageously of the same angular inclination, conveniently 22½ degrees so that the total angle included between the opposite walls of each conical seating surface is 45 degrees. The work can thereby be held firmly against rotation by very little axial strain on the nut.

The central part of the collet, where the slots are in overlapping relation, is so flexible that the collet (and the chuck body) can be much shorter than in conventional constructions. The dimensions shown are typical for precision chucks made according to the invention. The relative proportions of the several parts can be varied through a wide range. The diameter of the collet bore 15 can be decreased appreciably while preserving a high degree of resilience as described. A set of collets with different bore diameters can be used interchangeably in the same body.

In the chuck, work is gripped at two spaced zones along its length, both of which are accurately centered by cones in the single body which remains in perfect alignment with the head and stock spindle. Work which is distinctly undersize in both length and diameter, say several thousandths of an inch undersize in half inch diameter stock and having only 1½ inches of gripping surface can be centered perfectly firmly with the chuck without danger of wobble. Even tapered work can be firmly centered and held.

There is no chance for misalignment for the reason that the collet is unitary in structure. No loose or untightened fit is involved in the tightening of the collet and no threaded members are used for centering. In use, high concentricity is readily maintained; a run-out of less than 0.0001 or 0.0002 inch can easily be maintained.

The chuck is embodied in steel or other suitable material. Very effective heat treatment is possible by virtue of the open construction of the collet and slight changes in dimensions occurring in treatment do not affect the accuracy of the chuck. Grinding or other finishing of the seats can be, and is best done, in one operation to achieve perfect concentricity of these surfaces. The corresponding seats on the collet are also conveniently ground in one operation, as are the helical slots. If desired, the final finishing of the seats and the cutting of the slots can be done after heat treatment, though this is not necessary. The nut plays no part in centering the work and requires no special precision.

What I claim is:

1. In a chuck a collet of tubular shape conically tapered at each end and provided with a plurality of helical slots through the walls thereof extending from each end of the collet to a point substantially past the point to which the helical slots from the other end extend, whereby to define a plurality of separated radially flexible jaw portions at each end of the collet and an intermediate portion, of relatively high axial flexibility, in the zone where the slots from one end inter-leave with those from the other end.

2. In a chuck having a hollow body member provided with two spaced conical seats facing in the same direction, and collet-tightening means in axially adjustable relation to the body member, the improvement comprising a collet within the body member, of tubular shape having a tapered end portion engaging one of said seats and a spaced tapered end portion normally slightly spaced from the other seat, said collet being provided with a plurality of helical slots extending from each end of the collet to a point substantially past the point to which the helical slots from the other end extend, whereby to define plural, radially flexible helical jaw portions at each end of the collet and an intermediate portion, where the slots overlap, of relatively high axial resiliency; whereby on operation of the tightening means the jaw portions of the collet adjacent said engaged seat are compressed radially under resiliency of said intermediate portion and the other jaw portions are compressed radially under the axial movement of the clamping means.

REGINALD J. S. PIGOTT.